US012682509B2

(12) United States Patent
Huang et al.

(10) Patent No.: US 12,682,509 B2
(45) Date of Patent: Jul. 14, 2026

(54) TEXT-GUIDED VIDEO GENERATION

(71) Applicant: ADOBE INC., San Jose, CA (US)

(72) Inventors: Jiahui Huang, Vancouver (CA); Feng Liu, Beaverton, OR (US)

(73) Assignee: ADOBE INC., San Jose, CA (US)

( * ) Notice: Subject to any disclaimer, the term of this patent is extended or adjusted under 35 U.S.C. 154(b) by 149 days.

(21) Appl. No.: 18/428,579

(22) Filed: Jan. 31, 2024

(65) Prior Publication Data

US 2025/0245866 A1 Jul. 31, 2025

(51) Int. Cl.
*G06T 11/00* (2026.01)

(52) U.S. Cl.
CPC ......... *G06T 11/00* (2013.01); *G06T 2211/441* (2023.08)

(58) Field of Classification Search
None
See application file for complete search history.

(56) References Cited

U.S. PATENT DOCUMENTS

| | | | | |
|---|---|---|---|---|
| 11,748,940 B1* | 9/2023 | Xian | ..................... | G06T 15/205 |
| | | | | 345/419 |
| 2012/0113219 A1* | 5/2012 | Chang | .................. | H04N 13/139 |
| | | | | 348/43 |
| 2021/0125307 A1* | 4/2021 | Ranade | ................ | H04N 23/951 |
| 2021/0158554 A1* | 5/2021 | Asawaroengchai | .... | G06T 7/194 |
| 2022/0156886 A1* | 5/2022 | Petrangeli | ............... | G06T 3/606 |

| | | | | |
|---|---|---|---|---|
| 2022/0239844 A1* | 7/2022 | Lv | ......................... | G06T 15/205 |
| 2022/0277510 A1* | 9/2022 | Funt | ........................ | G06N 3/04 |
| 2023/0051409 A1* | 2/2023 | Du | ......................... | H04N 7/157 |
| 2023/0281913 A1* | 9/2023 | Rematas | ................... | G06T 7/55 |
| | | | | 345/419 |
| 2023/0360372 A1* | 11/2023 | Zhao | .................... | G06V 10/761 |
| 2023/0377180 A1* | 11/2023 | Ambrus | ................. | G06T 15/20 |
| 2024/0153197 A1* | 5/2024 | Guizilini | ................ | G06T 15/08 |
| 2024/0256841 A1* | 8/2024 | Abrams | ............. | G06F 16/9538 |
| 2024/0273809 A1* | 8/2024 | Huang | .................... | G06T 17/00 |
| 2024/0303789 A1* | 9/2024 | Mirzaei | .................. | G06T 17/00 |
| 2024/0378872 A1* | 11/2024 | Ach | ...................... | G06V 10/803 |
| 2025/0086833 A1* | 3/2025 | Liu | ........................ | G06V 10/513 |
| 2025/0131642 A1* | 4/2025 | Yang | ........................ | G06T 19/20 |
| 2025/0166267 A1* | 5/2025 | Bai | ........................ | G06V 10/48 |

(Continued)

OTHER PUBLICATIONS

Niklaus, et al., "3D Ken Burns Effect from a Single Image", arXiv preprint arXiv:1909.05483v1 [cs.CV] Sep. 12, 2019, 15 pages.

(Continued)

*Primary Examiner* — David H Chu

(74) *Attorney, Agent, or Firm* — F. CHAU & ASSOCIATES, LLC

(57) ABSTRACT

A method, apparatus, non-transitory computer readable medium, and system for video generation include obtaining an input image having an element depicted in a first view angle, generating a synthetic image depicting the element of the input image from a second view angle different from the first view angle, generating an intermediate image by interpolating based on the synthetic image, and generating a video based on the synthetic image and the intermediate image, where the video depicts the element of the input image from a changing view angle.

20 Claims, 10 Drawing Sheets

(56) References Cited

U.S. PATENT DOCUMENTS

2025/0193363 A1* 6/2025 Liu ...................... H04N 13/279

OTHER PUBLICATIONS

Rombach, et al., "High-Resolution Image Synthesis with Latent Diffusion Models", arXiv preprint arXiv:2112.10752v2 [cs.CV] Apr. 13, 2022, 45 pages.

Ho, et al., "Denoising Diffusion Probabilistic Models", arXiv preprint arXiv:2006.11239v2 [cs.LG] Dec. 16, 2020, 25 pages.

Lugmayr, et al., "Repaint: Inpainting using Denoising Diffusion Probabilistic Models", arXiv preprint arXiv:2201.09865v4 [cs.CV] Aug. 31, 2022, 25 pages.

Niklaus, et al., "Splatting-based Synthesis for Video Frame Interpolation", arXiv preprint arVix:2201.10075v2 [cs.CV] Oct. 26, 2022, 11 pages.

Xian, et al., "Structure-Guided Ranking Loss for Single Image Depth Prediction", In Proceedings of the IEEE/CVF Conference on Computer Vision and Pattern Recognition, pp. 611-620.

* cited by examiner

TEXT-GUIDED VIDEO GENERATION

BACKGROUND

The following relates generally to video generation, and more specifically to video generation using a machine learning model. Video generation refers to the use of a computer to generate a video using an algorithm or a processing network. Video generation methods include computer-generated imagery (CGI), generative models, neural networks, motion captures, and frame interpolations. In some cases, video generation video generation can be based on input guidance such as a text prompt or a reference image.

Image machine learning models can include generative adversarial networks (GANs), diffusion models, and other model types. They can include architectural elements such as convolutional layers and attention mechanisms. Video generation can be accomplished by operating an image generation model multiple times, or by generating multiple frames simultaneously.

SUMMARY

Aspects of the present disclosure provide methods, non-transitory computer readable media, apparatuses, and systems for video generation. According to an aspect of the present disclosure, a machine learning model generates a video based on a text prompt input. In one aspect, the video depicts an element described by the text prompt with changing view angles. In one aspect, the machine learning model generates a first novel view image from a first view angle based on the text prompt. In some cases, the machine learning model generates a second novel view image from a second view angle based on the first novel view image. In one aspect, the first view angle and second view angle are in the same view trajectory. The machine learning model generates a video by interpolating intermediate images from the first novel view image and the second novel view image along the view trajectory.

A method, apparatus, non-transitory computer readable medium, and system for video generation are described. One or more aspects of the method, apparatus, non-transitory computer readable medium, and system include obtaining an input image having an element depicted in a first view angle and generating, using an image generation model, a synthetic image depicting the element of the input image from a second view angle different from the first view angle. One or more aspects include generating an intermediate image by interpolating based on the synthetic image. One or more aspects further include generating a video based on the synthetic image and the intermediate image. In some cases, the video depicts the element of the input image from a changing view angle.

An apparatus, system, and method for video generation are described. One or more aspects of the apparatus, system, and method include at least one processor and at least one memory storing instructions executable by the at least one processor. One or more aspects further include an image generation model comprising parameters stored in the at least one memory and trained to generate a synthetic image depicting an element of an input image from a second view angle different from a first view angle of the input image. One or more aspects include an interpolation component comprising parameters stored in the at least one memory and configured to generate an intermediate image by interpolating based on the synthetic image. One or more aspects include a video generation component comprising parameters stored in the at least one memory and configured to generate a video based on the synthetic image and the intermediate image. In some cases, the video depicts the element of the input image from a changing view angle.

DETAILED DESCRIPTION

Figure 1:
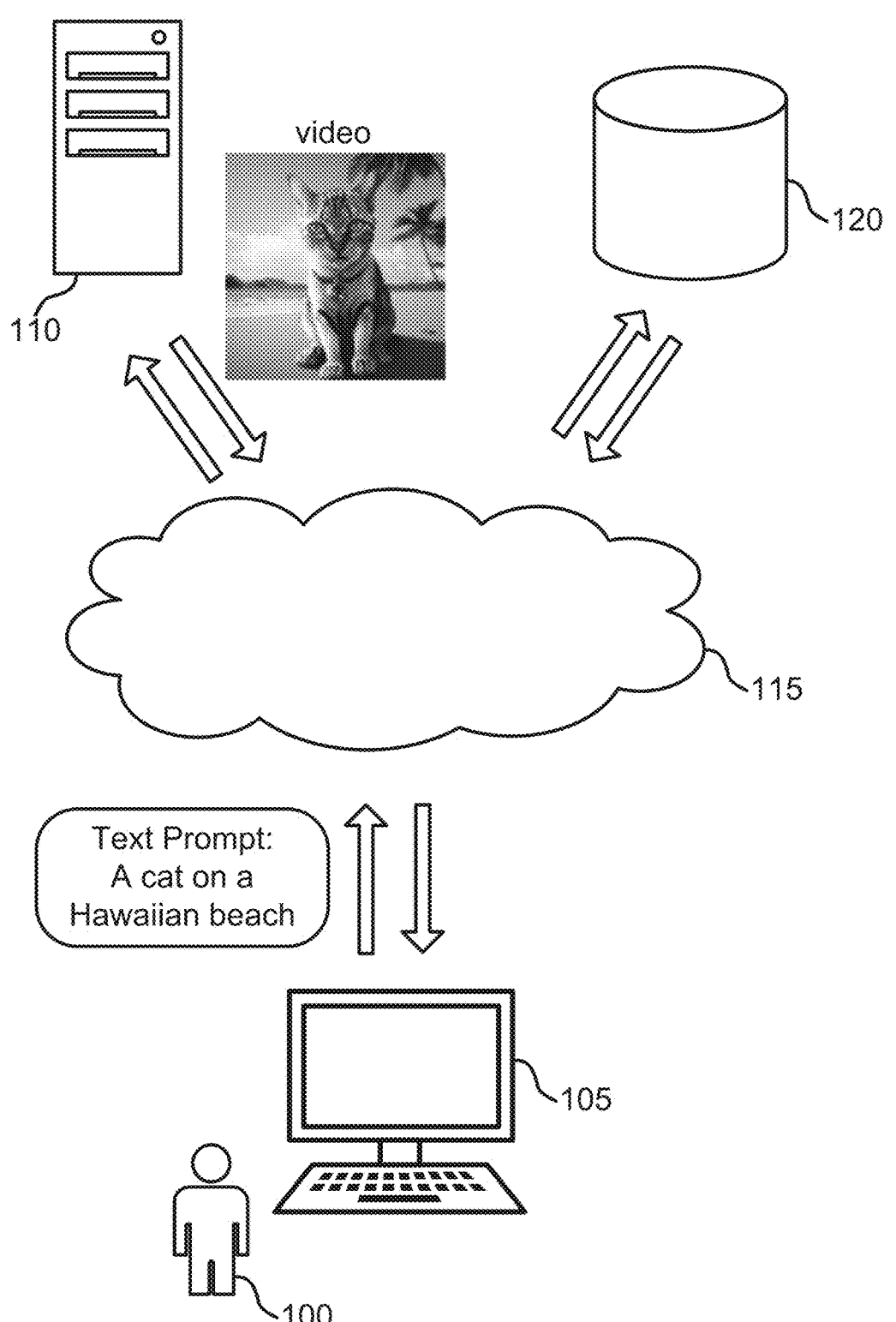
FIG. 1 shows an example of a video generation system according to aspects of the present disclosure.

Aspects of the present disclosure provide methods, non-transitory computer readable media, apparatuses, and systems for video generation. According to an aspect of the present disclosure, a machine learning model generates a video based on a text prompt input. In one aspect, the video depicts an element described by the text prompt with changing view angles. In one aspect, the machine learning model generates a first novel view image (e.g., a synthetic image) from a first view angle based on the text prompt. In one aspect, the machine learning model generates a second novel view image (e.g., an additional synthetic image) from a second view angle based on the first novel view image. In one aspect, the first view angle and second view angle are in the same view trajectory. The machine learning model generates a video by interpolating intermediate images from the first novel view image and the second novel view image along the view trajectory.

According to some aspects, a view component generates novel views from a plurality of different view angles and corresponding masks based on the synthetic image. In some cases, the machine learning model projects the synthetic image (e.g., a 2D image) into a 3D space. For example, the machine learning model augments Z values that represent the distance between an observer (e.g., an imaginary camera) and the pixels at various view angles of an element in the synthetic image to generate a 3D point cloud for the element. By using the 3D point cloud information, the machine learning model can view the element of the synthetic image from different view angles. In some cases, the machine learning model displays the corresponding occlusion area at the different view angles.

According to some embodiments, the machine learning model includes an inpainting component configured to inpaint the occlusion area of a novel view from a different view angle to generate the additional synthetic image. In some cases, for example, the inpainting component includes a diffusion-based image inpainting model. The additional synthetic image is used as an input to an interpolation component to generate intermediate images.

According to some embodiments, an interpolation component generates intermediate images by interpolation based on the synthetic image and the additional synthetic image. For example, the interpolation component generates the intermediate image from a third view angle. In some cases, the third view angle is between the first view angle of the synthetic image and the second view angle of the additional synthetic image. By interpolating the intermediate images from two images, the machine learning model can generate an output video with temporal consistency and image consistency.

Conventional video processing techniques, for video editing or generation, utilize inpainting techniques to inpaint intermediate images. For example, to increase the frame rate of a video, a conventional video processing model generates intermediate images from different view angles and having one or more occlusion areas. The conventional video processing model inpaints each of the intermediate images to be inserted into frames of the video. In some cases, for example, the conventional video processing models inpaints hundreds of intermediate images. As a result, the processing time is long. Additionally, processing time scales with the number of intermediate images to be inpainted.

In some cases, inpainting multiple intermediate images leads to inconsistency (for example, temporal or image inconsistency). For example, an inpainting model fills missing pixels of the intermediate image by using a GAN-based process or a diffusion process. In some cases, the inpainting model generates different versions of the intermediate image. As a result, the conventional video generation model cannot learn the image consistency and temporal consistency between each frame of the video.

The present disclosure provides systems and methods that improve on conventional video generation models by enabling reduced processing time and enhanced consistency when generating videos based on a text prompt. This is achieved by reducing the amount of generative inpainting that is performed on intermediate images, and performs a more efficient interpolation process instead.

For example, in contrast to conventional video generation models that generate each frame of the video by inpainting an occlusion region of each image, the present system inpaints two key images (e.g., a first image used as a first frame and a second image used as a final frame of the video) and interpolates the remaining intermediates frames (or images) based on the two key images. By generating two key images instead of inpainting each image, processing time can be reduced because interpolating intermediate images can be done much faster than inpainting the intermediate images.

Furthermore, interpolating instead of inpainting each image can increase consistency between frames. For example, interpolating intermediate images based on the two key frames, timing and motion across the frames are preserved. Additionally, spatial structure and details across frames are preserved. In some aspects, the systems and methods described herein enable the generation of videos that depict an object from a changing perspective from a wider range of camera angles than conventional methods. Some embodiments achieve these improvements by generating several synthetic images based on a text prompt using an image generation model and then interpolating additional intermediate images based on the synthetic.

Figure 3:
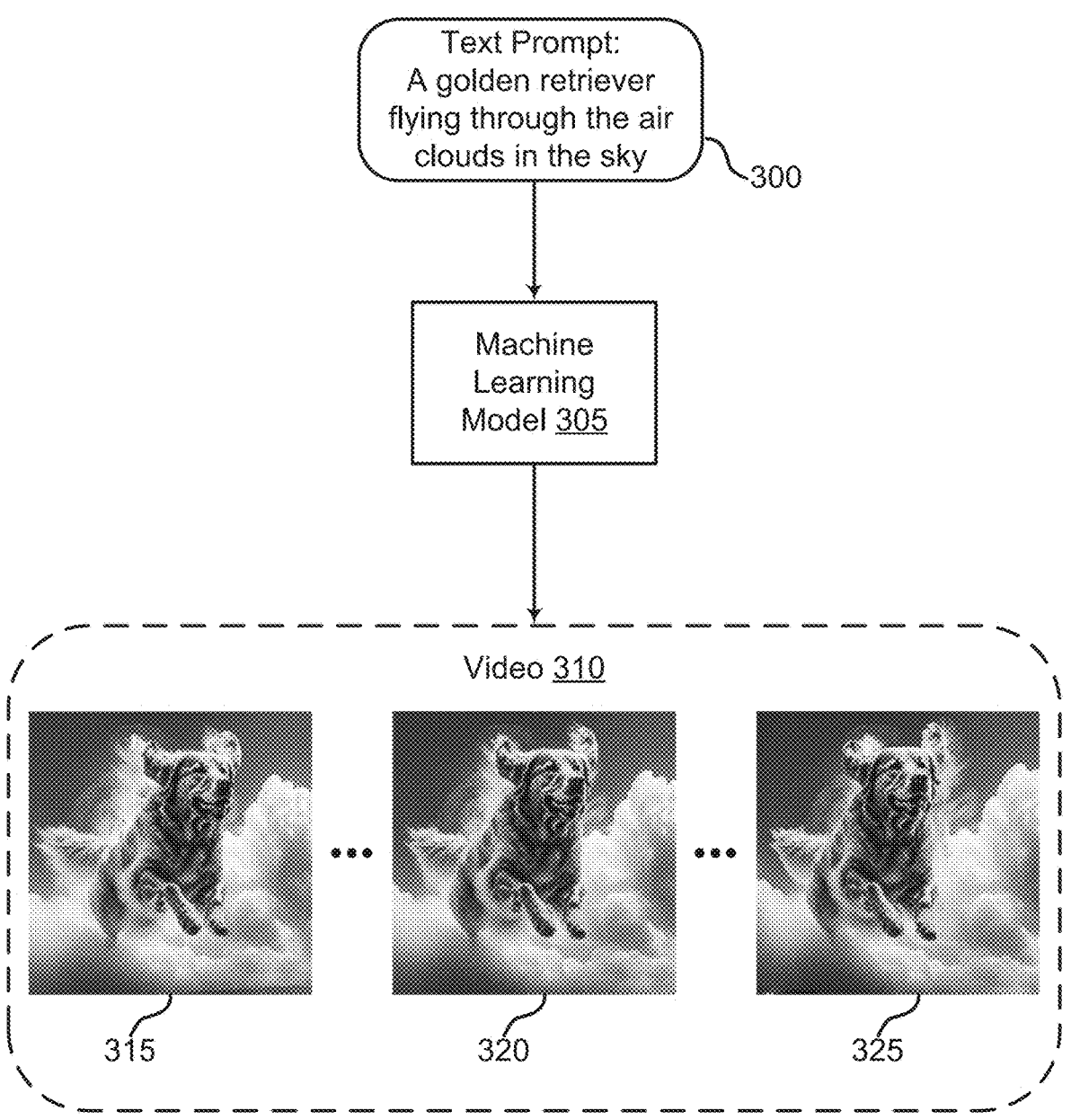
FIG. 3 shows an example of text-to-video generation according to aspects of the present disclosure.

For example, as shown in at least FIG. 3, a machine learning model interpolates intermediate images based on the synthetic image and the additional synthetic image. By generating intermediate images using interpolation, instead of using inpainting methods, the machine learning model of the present disclosure can generate a video having temporal and image consistency.

According to some embodiments, the inpainting component of the present disclosure can inpaint images with large regions of missing pixels based on large and complex camera motions. In some cases, for example, the inpainting component can efficiently fill in the missing pixels outside the boundaries of an input image (e.g., the synthetic image) for a video with a camera motion. In some cases, for example, the inpainting component can fill in the missing pixels based on the 3D point cloud information of the synthetic image. Accordingly, the video generation system of the present disclosure can generate a video having a large range of view angles compared to a video generated by the conventional video generation model.

By interpolating the intermediate images, embodiments of the present disclosure can enhance video processing applications such as the film production industry, content creation, interactive learning and training, and entertainment. For example, the machine learning model can efficiently generate a video depicting an element described by the text prompt with changing view angles. For example, the machine learning model inpaints two or three novel views from different view angles to generate synthetic images for the end frames (or a middle frame) of the video. In some cases, intermediate images are interpolated from the synthetic images using the interpolation component or video frame interpolation module. By using the interpolation component, temporal consistency and image consistency of the generated video are enhanced, and the computational cost for video generation is reduced.

Figure 9:
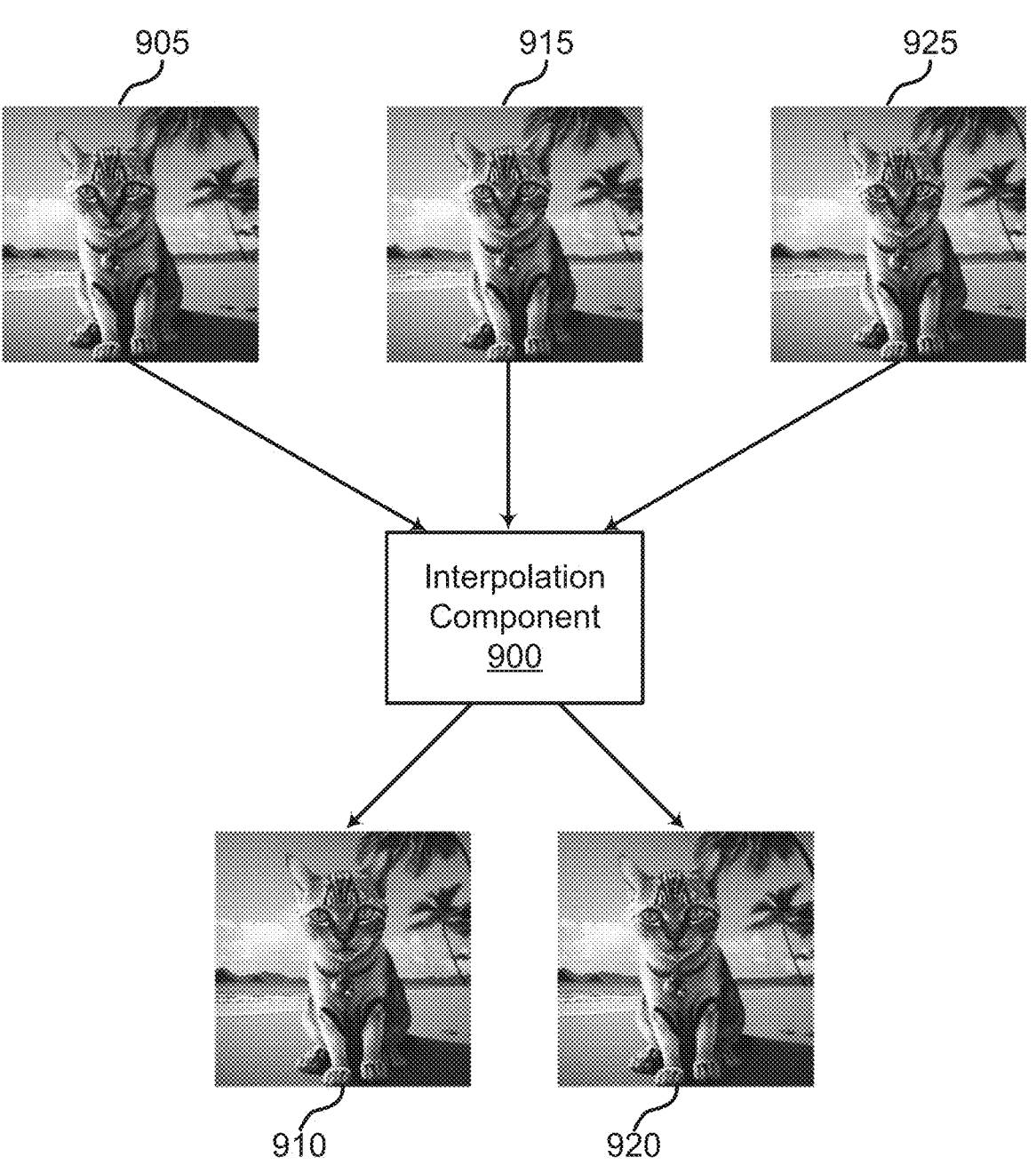
FIG. 9 shows an example of an interpolation component according to aspects of the present disclosure.
Figure 10:
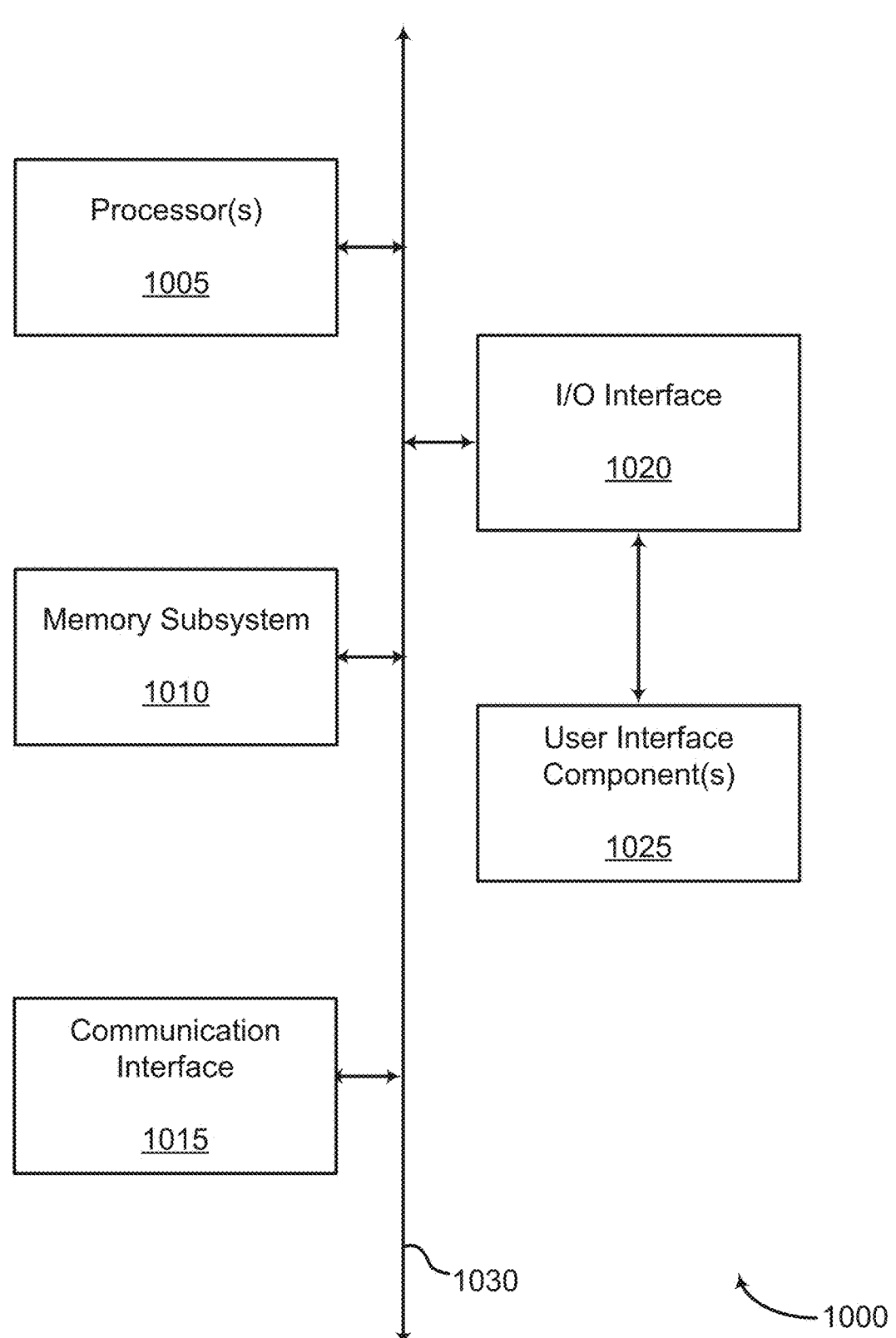
FIG. 10 shows an example of a computing device according to aspects of the present disclosure.

An example system of the inventive concept in video generation is provided with reference to FIGS. 1 and 10. An example application of the inventive concept in video generation is provided with reference to FIGS. 2-3. Details regarding the architecture of a video generation apparatus are provided with reference to FIGS. 5-9. An example of a process for video generation is provided with reference to FIG. 4.

Video Generation

In FIGS. 1-4, a method, apparatus, non-transitory computer readable medium, and system for video generation are described. One or more aspects of the method, apparatus, non-transitory computer readable medium, and system include obtaining an input image having an element depicted in a first view angle and generating, using an image generation model, a synthetic image depicting an element of the input image from a second view angle different from the first view angle. One or more aspects further include generating an intermediate image by interpolating based on the synthetic image. One or more aspects further include generating a video based on the synthetic image and the intermediate image. In some cases, the video depicts the element of the input image from a changing view angle.

Some examples of the method, apparatus, non-transitory computer readable medium, and system further include generating, using the image generation model, an additional synthetic image depicting the element of the input image from a third view angle. In some cases, the intermediate image is interpolated based on the synthetic image and the additional synthetic image. Some examples of the method, apparatus, non-transitory computer readable medium, and system further include identifying a view trajectory. In some cases, the second view angle is based on the view trajectory.

Some examples of the method, apparatus, non-transitory computer readable medium, and system further include generating a preliminary image from the second view angle. In some cases, the preliminary image includes an occluded area and the synthetic image is generated by inpainting the occluded area of the preliminary image. Some examples of the method, apparatus, non-transitory computer readable medium, and system further include obtaining a depth map of the input image. In some cases, the synthetic image is generated based on the depth map.

Some examples of the method, apparatus, non-transitory computer readable medium, and system further include projecting the input image to a 3D point cloud based on the depth map. Some examples of the method, apparatus, non-transitory computer readable medium, and system further include generating an occlusion mask based on the depth map. In some cases, the synthetic image is generated by performing inpainting based on the occlusion mask.

Some examples of the method, apparatus, non-transitory computer readable medium, and system further include obtaining a text prompt. In some cases, the synthetic image is generated based on the text prompt. Some examples of the method, apparatus, non-transitory computer readable medium, and system further include obtaining a text prompt. In some cases, the input image is generated based on the text prompt. In some aspects, the image generation model is trained to generate images using training data that includes a ground truth image and an occlusion mask.

FIG. 1 shows an example of a video generation system according to aspects of the present disclosure. The example shown includes user 100, user device 105, video generation apparatus 110, cloud 115, and database 120. Video generation apparatus 110 is an example of, or includes aspects of, the corresponding element described with reference to FIG. 5.

Referring to FIG. 1, user 100 provides a text prompt to video generation apparatus 110 via user device 105 and cloud 115. In some cases, the text prompt describes the content of a video to be generated by the video generation apparatus 110. For example, the text prompts states "A cat on a Hawaiian beach." The video generation apparatus 110 uses a machine learning model to generate a synthetic image having a first view angle based on the text prompt. In some cases, user 100 can provide an input image to video generation apparatus 110 to generate the video.

In one aspect, video generation apparatus 110 uses a machine learning model to generate an additional synthetic image depicting the cat from a second view angle. In some cases, the machine learning model performs inpainting to generate the additional synthetic image. The machine learning model generates intermediate images by interpolating based on the synthetic image and the additional synthetic image. In some cases, the intermediate images depict the cat from a view angle between the first view angle and the second view angle. The machine learning model generates a video based on the synthetic image, intermediate images, and the additional synthetic image. In some cases, the video depicts the cat from a changing view angle (e.g., from the first view angle to the second view angle). In some cases, video generation apparatus 110 displays the video on user device 105 to user 100 via cloud 115.

As used herein, the term "view angle" refers to the point of view of an element from an image with respect to an observer (e.g., a camera). In some cases, the view angle refers to the perspective from which an element of the image is rendered. For example, the view angle provides information including perceived depth and spatial relationships of an element in three-dimensional space from the two-dimensional image. In some cases, for example, a view angle of 0 degrees represents the front view of an element. In some cases, for example, a view angle of –10 degrees represents a front view displaced by 10 degrees to the left (e.g., the camera is on the left side) of the element.

As used herein, the term "view trajectory" represents a path in which the view angles follow. For example, a linear view trajectory represents view angles linearly spaced apart from each other. For example, a curved view trajectory represents view angles along a path in three-dimensional curvature.

User device 105 may be a personal computer, laptop computer, mainframe computer, palmtop computer, personal assistant, mobile device, or any other suitable processing apparatus. In some examples, user device 105 includes software that incorporates an image detection application. In some examples, the image detection application on user device 105 may include functions of video generation apparatus 110.

A user interface may enable user 100 to interact with user device 105. In some embodiments, the user interface may include an audio device, such as an external speaker system, an external display device such as a display screen, or an input device (e.g., a remote-controlled device interfaced with the user interface directly or through an I/O controller module). In some cases, a user interface may be a graphical user interface (GUI). In some examples, a user interface may be represented in code in which the code is sent to the user device 105 and rendered locally by a browser. The process of using the video generation apparatus 110 is further described with reference to FIG. 2.

Video generation apparatus 110 is an example of, or includes aspects of, the corresponding element described with reference to FIG. 5. According to some aspects, video generation apparatus 110 includes a computer implemented network comprising a machine learning model, image generation model, interpolation component, video generation component, depth component, projection component, and view component. Video generation apparatus 110 further includes a processor unit, a memory unit, and an I/O module. In some embodiments, video generation apparatus 110 further includes a communication interface, user interface components, and a bus as described with reference to FIG. 10. Additionally, video generation apparatus 110 communicates with user device 105 and database 125 via cloud 115. Further detail regarding the operation of video generation apparatus 110 is provided with reference to FIG. 2.

In some cases, video generation apparatus 110 is implemented on a server. A server provides one or more functions to users linked by way of one or more of the various networks. In some cases, the server includes a single microprocessor board, which includes a microprocessor responsible for controlling aspects of the server. In some cases, a server uses the microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user (e.g., user 100). The term cloud is sometimes used to describe data centers available to many users over the Internet. Some large cloud networks have functions distributed over multiple locations from central servers. A server is designated an edge server if the server has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

According to some aspects, database 120 stores training data including a ground truth image and an occlusion mask. Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user (e.g., user 100) interacts with the database controller. In other cases, the database controller may operate automatically without user interaction.

Figure 2:
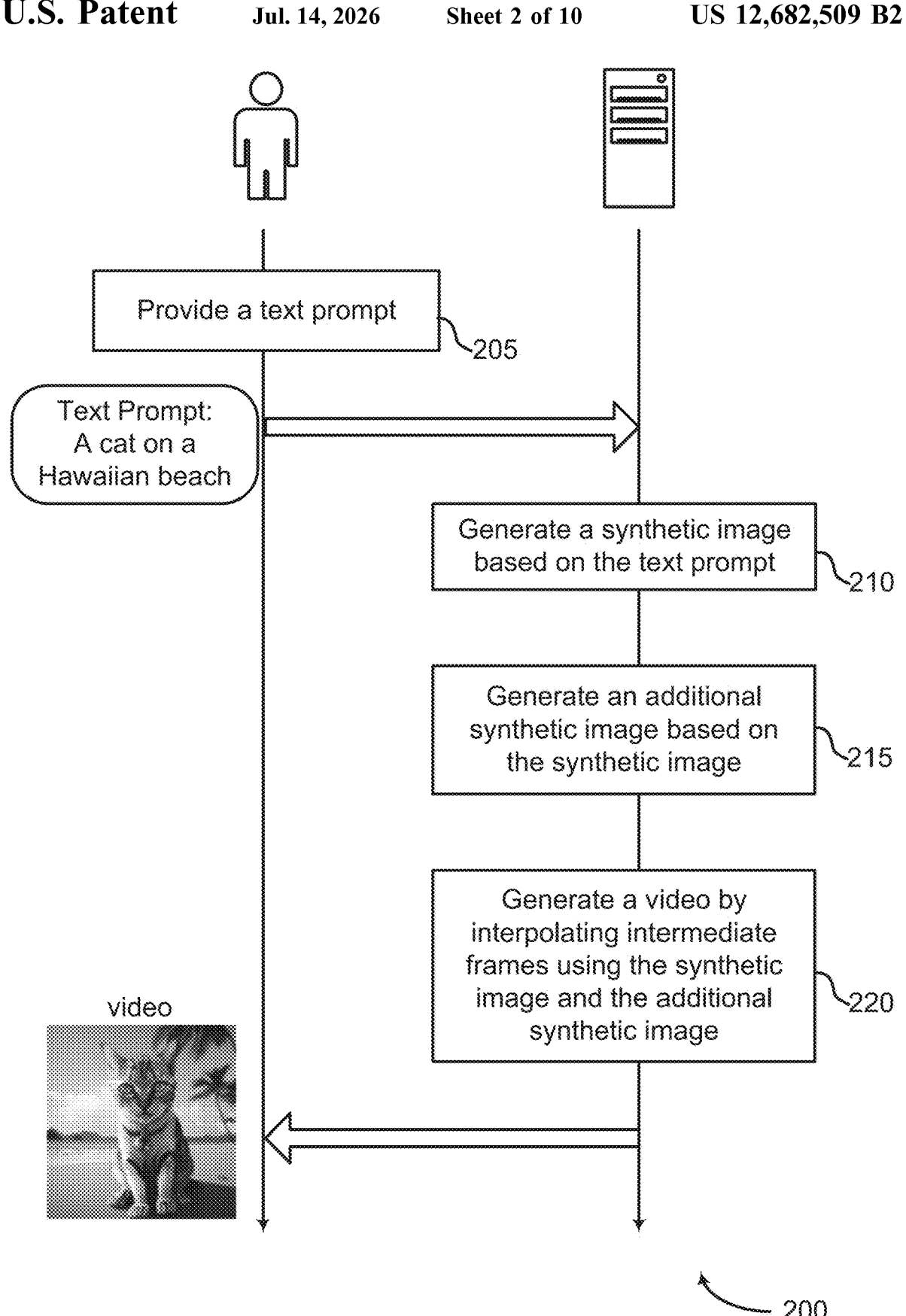
FIG. 2 shows an example of a method for generating a video based on a text prompt according to aspects of the present disclosure.

FIG. 2 shows an example of a method 200 for generating a video based on a text prompt according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 2, for example, a text prompt "A cat on Hawaiian beach" is provided to the video generation apparatus (for example, the video generation apparatus described with reference to FIGS. 1 and 5). The video generation apparatus generates a synthetic image based on the text prompt. In some cases, the synthetic image depicts the cat from a first view angle. The video generation apparatus generates an additional synthetic image depicting the cat from a second view angle based on the synthetic image. In some cases, the first view angle and the second view angle are in the same view trajectory. The video generation apparatus generates intermediate images based on the synthetic image and the additional synthetic image using image interpolation. The video generation apparatus generates a video using the synthetic image, intermediate images, and the additional synthetic image by using these images as video frames.

At operation 205, the system provides a text prompt. In some cases, the operations of this step refer to, or may be performed by, a user as described with reference to FIG. 1. In some cases, for example, the user (e.g., the user described with reference to FIG. 1) provides a text prompt of "A cat on a Hawaiian beach" to the video generation apparatus (e.g., the video generation apparatus described with reference with FIGS. 1 and 5). In some cases, the text prompt describes contents of the video to be generated.

At operation 210, the system generates a synthetic image based on the text prompt. In some cases, the operations of this step refer to, or may be performed by, a video generation apparatus as described with reference to FIGS. 1 and 5. In some cases, the operations of this step refer to, or may be performed by, an image generation model as described with reference to FIGS. 5 and 6. Image generation model is an example of, or includes aspects of, the diffusion model described with reference to FIG. 7.

In some embodiments, the synthetic image can be provided by a user. For example, the user provides an input image depicting a cat on a Hawaiian beach to the video processing apparatus. In some cases, the synthetic image is generated using a text-guided diffusion model. In some cases, the synthetic image can be guided by other types of conditionings such as color, image, and style. In some cases, the synthetic image depicts the cat from a first view angle.

At operation 215, the system generates an additional synthetic image based on the synthetic image. In some cases, the operations of this step refer to, or may be performed by, a video generation apparatus as described with reference to FIGS. 1 and 5. In some cases, the operations of this step refer to, or may be performed by, an image generation model as described with reference to FIGS. 5 and 6. In some cases, the operation of this step refers to, or may be performed by, a view component as described with reference to FIGS. 5, 6 and 8.

In some cases, the additional synthetic image depicts the cat from a second view angle different from the first view angle of the synthetic image. For example, the view component generates a preliminary image from the second view angle based on the synthetic image, where the preliminary image includes an occluded area. In some cases, an inpainting component is used to generate the additional synthetic image by inpainting the occlusion area of the preliminary image.

At operation 220, the system generates a video by interpolating intermediate frames using the synthetic image and the additional synthetic image. In some cases, the operations of this step refer to, or may be performed by, a video generation apparatus as described with reference to FIGS. 1 and 5. In some cases, the operations of this step refer to, or may be performed by, a video generation component as described with reference to FIGS. 5 and 6. In some cases, the operations of this step refer to, or may be performed by, an interpolation component as described with reference to FIGS. 5, 6, and 9.

In some cases, an interpolation component generates intermediate images using image interpolation based on the synthetic image and the additional synthetic image. For example, each of the intermediate images depicts the cat at a view angle between the first view angle and the second view angle. In some embodiments, the video generation component combines the synthetic image, intermediate images, and the additional synthetic image to generate the video. In some cases, the video depicts the cat from a changing view angle. In some cases, the synthetic image is used as the first frame of the video and the additional synthetic image is used as the last frame of the video.

FIG. 3 shows an example of text-to-video generation according to aspects of the present disclosure. The example shown includes text prompt 300, machine learning model 305, and video 310. In one aspect, video 310 includes first frame 315, second frame 320, and third frame 325.

Referring to FIG. 3, machine learning model 305 receives text prompt 300 and generates video 310 based on text prompt 300. In some cases, text prompt 300 describes an element to be generated in video 310. For example, text prompt 300 states "A golden retriever flying through the air clouds in the sky." Machine learning model 305 generates video 310 showing a golden retriever flying in the sky with changing view angles of the golden retriever.

In some embodiments, machine learning model 305 generates a synthetic image having contents described by text prompt 300 using a text-to-image model. In some cases, the text-to-image model is a diffusion model (e.g., the diffusion model described with reference to FIG. 7). In some cases, machine learning model 305 receives an input image having contents described by text prompt 300. Machine learning model 305 generates a preliminary image with a corresponding occlusion mask from a second view angle different from the first view angle of the synthetic image. In some cases, the occlusion mask depicts the cat at the second view angle having an occlusion area to be inpainted. In some cases, machine learning model 305 generates an additional synthetic image by inpainting the occlusion area of the preliminary image.

According to some aspects, machine learning model 305 generates an intermediate image by using image interpolation based on the synthetic image and the additional synthetic image. In some cases, machine learning model 305 combines the synthetic image, the intermediate image, and the additional synthetic image to generate video 310. In some cases, first frame 315 represents the additional synthetic image, second frame 320 represents the intermediate image, and third frame 325 represents the synthetic image.

According to some embodiments, machine learning model 305 generates a second preliminary image and a second occlusion mask from a third view angle different from the first view angle and the second view angle. In some cases, the second occlusion mask depicts the cat at the third view angle having an occlusion area to be inpainted. In some cases, machine learning model 305 generates a second synthetic image by inpainting the occlusion area of the second preliminary image.

In some cases, machine learning model 305 generates a first intermediate image by using image interpolation based on the additional synthetic image and the synthetic image. In some cases, machine learning model 305 generates a second intermediate image by using image interpolation based on the synthetic image and the second synthetic image. In some cases, machine learning model 305 combines the additional synthetic image, the first intermediate image, the synthetic image, the second intermediate image, and the second synthetic image to generate video 310. In some cases, first frame 315 represents the additional synthetic image, second frame 320 represents the synthetic image, and third frame 325 represents the second synthetic image.

In some cases, the view angles represent the relative position between a camera and the element (e.g., the golden retriever) of the synthetic image. For example, the first view angle is 0 degrees. Sometimes, 0 degrees is referred to as a ground angle, where the synthetic image depicts the golden retriever from the front view. In some cases, the second view angle is −10 degrees. For example, −10 degrees represents the perspective location of the camera on the left side of the golden retriever. In some cases, the third view angle is 10 degrees. For example, 10 degrees represents the perspective location of the camera on the right side of the golden retriever.

In some cases, each of the intermediate images depicts the golden retriever at a view angle along a view trajectory that includes the first view angle, the second view angle, the third view angle, or a combination thereof. In some cases, the view angles along the view trajectory are linearly spaced out. In some cases, the view angles along the view trajectory are curved along a path in a three-dimensional curvature.

According to some embodiments, machine learning model 305 is implemented on a user interface. The user interface includes features for various types of camera motions. For example, the features may include "dolly zoom", "rotate", "pan", and "zoom". In one aspect, "dolly zoom" changes the position of the camera to move forward or away from the element. In one aspect, "rotate" changes the position of the camera to move around the axis of the element. In one aspect, "pan" changes the position of the camera to move side to side while keeping the camera's orientation fixed. In one aspect, "zoom" involves adjusting the focal length of a camera lens to make the element appear larger or smaller.

Conventional video generation models generate the video having changing view angles by inpainting each of the intermediate images. For example, given the first frame (e.g., first frame 315) and last frame (e.g., third frame 325) of a video (e.g., video 310), a conventional video generation model generates a plurality of preliminary images with occlusion areas depicting the element from different view angles. The conventional video generation model inpaints each of the plurality of preliminary images to obtain the plurality of intermediate images. Then, the conventional video generation model combines the first frame, the plurality of intermediate images, and the last frame to generate the video.

However, by inpainting each of the plurality of preliminary images to generate the intermediate images, each frame of the video may appear to be distorted. By generating intermediate images using inpainting techniques, the conventional video generation model cannot learn the image consistency and temporal consistency between the first frame and the last frame of the video. Additionally, processing time scales with the number of intermediate images to be inpainted.

Text prompt 300 is an example of, or includes aspects of, the corresponding element described with reference to FIGS. 6 and 7. Machine learning model 305 is an example of, or includes aspects of, the corresponding element described with reference to FIGS. 5 and 6. Video 310 is an example of, or includes aspects of, the corresponding element described with reference to FIG. 6.

Figure 4:
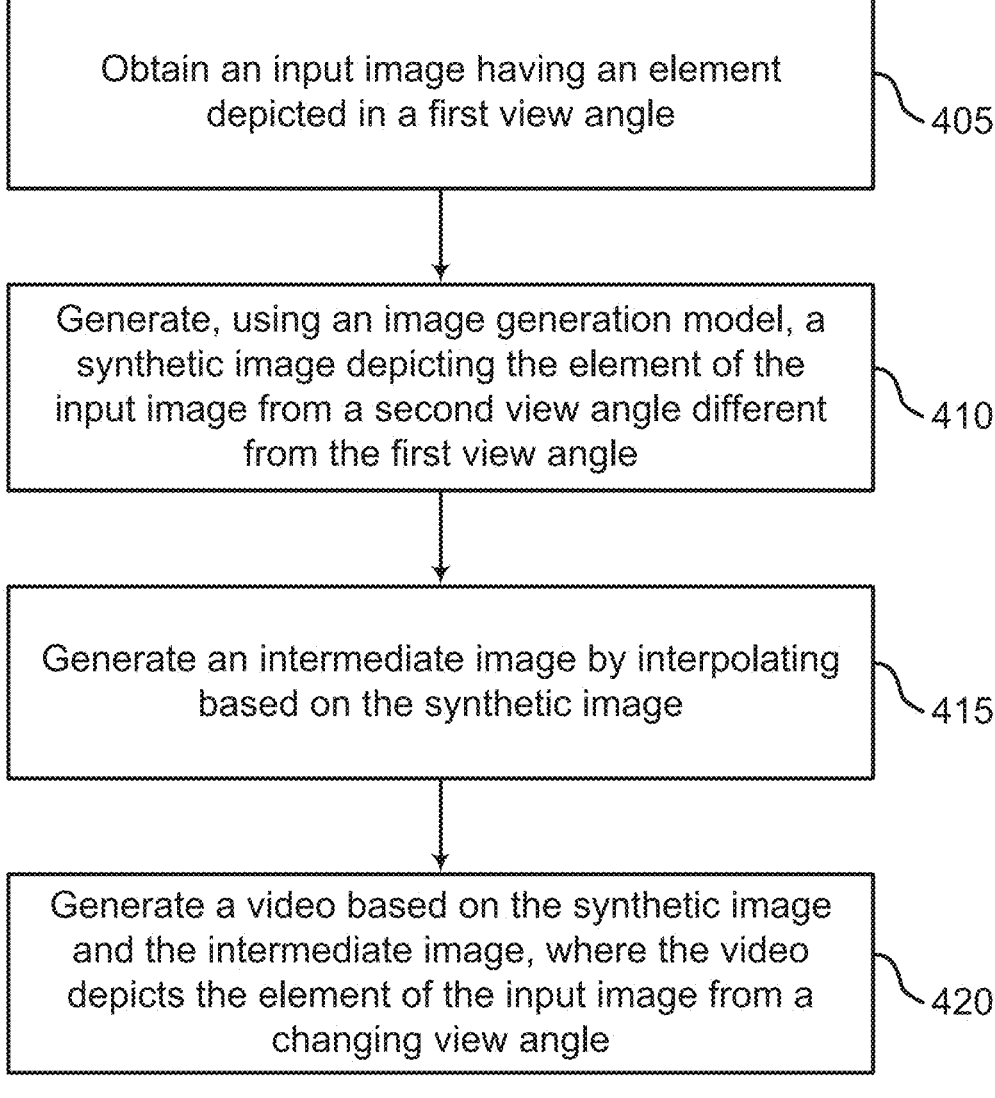
FIG. 4 shows an example of a method for generating a video using image interpolation according to aspects of the present disclosure.

FIG. 4 shows an example of a method 400 for generating a video using image interpolation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the system obtains an input image having an element depicted in a first view angle. In some cases, the operations of this step refer to, or may be performed by, a machine learning model as described with reference to FIGS. 3, 5, and 6. In some cases, the input image is a synthetic image generated by a text-to-image generation model. For example, the machine learning model receives a text prompt describing an element. The machine learning model generates a synthetic image depicting the element described by the text prompt. In some cases, the first view angle is a ground angle depicting a front view of the element.

At operation 410, the system generates, using an image generation model, a synthetic image depicting the element of the input image from a second view angle different from the first view angle. In some cases, the operations of this step refer to, or may be performed by, an image generation model as described with reference to FIGS. 5 and 6. In some cases, the operations of this step refer to, or may be performed by, a view component as described with reference to FIGS. 5, 6, and 8.

In some cases, for example, the machine learning model generates a preliminary image from the second view angle based on the synthetic image, where the preliminary image includes an occluded area. In some cases, an inpainting component is used to generate the additional synthetic image by inpainting the occlusion area of the preliminary image to generate the synthetic image. In some cases, the second view angle and the first view angle are in the same view trajectory.

At operation 415, the system generates an intermediate image by interpolating based on the synthetic image. In some cases, the operations of this step refer to, or may be performed by, an interpolation component as described with reference to FIGS. 5, 6, and 9. In some cases, for example, the intermediate image depicts the element of the input image from a view angle between the first view angle and the second view angle. In some cases, the machine learning model generates a plurality of intermediate images based on the input image and synthetic image by interpolating.

At operation 420, the system generates a video based on the synthetic image and the intermediate image, where the video depicts the element of the input image from a changing view angle. In some cases, the operations of this step refer to, or may be performed by, a video generation component as described with reference to FIGS. 5 and 6. In some cases, for example, the first frame of the video is the synthetic image and the last frame of the video is the input image.

System Architecture

An apparatus, system, and method for video generation are described. One or more aspects of the apparatus, system, and method include at least one processor and at least one memory storing instructions executable by the at least one processor. One or more aspects further include an image generation model comprising parameters stored in the at least one memory and trained to generate a synthetic image depicting an element of an input image from a second view angle different from a first view angle of the input image. One or more aspects further include an interpolation component comprising parameters stored in the at least one memory and configured to generate an intermediate image by interpolating based on the synthetic image. One or more aspects further include a video generation component comprising parameters stored in the at least one memory and configured to generate a video based on the synthetic image and the intermediate image. In some cases, the video depicts the element of the input image from a changing view angle.

Some examples of the apparatus, system, and method further include a depth component comprising parameters stored in the at least one memory and configured to generate a depth map based on the input image. Some examples of the apparatus, system, and method further include a projection component comprising parameters stored in the at least one memory and configured to project the input image to a 3D point cloud.

Some examples of the apparatus, system, and method further include a view component comprising parameters stored in the at least one memory and configured to generate a preliminary image from the second view angle. In some aspects, the image generation model comprises a diffusion UNet architecture.

Figure 5:
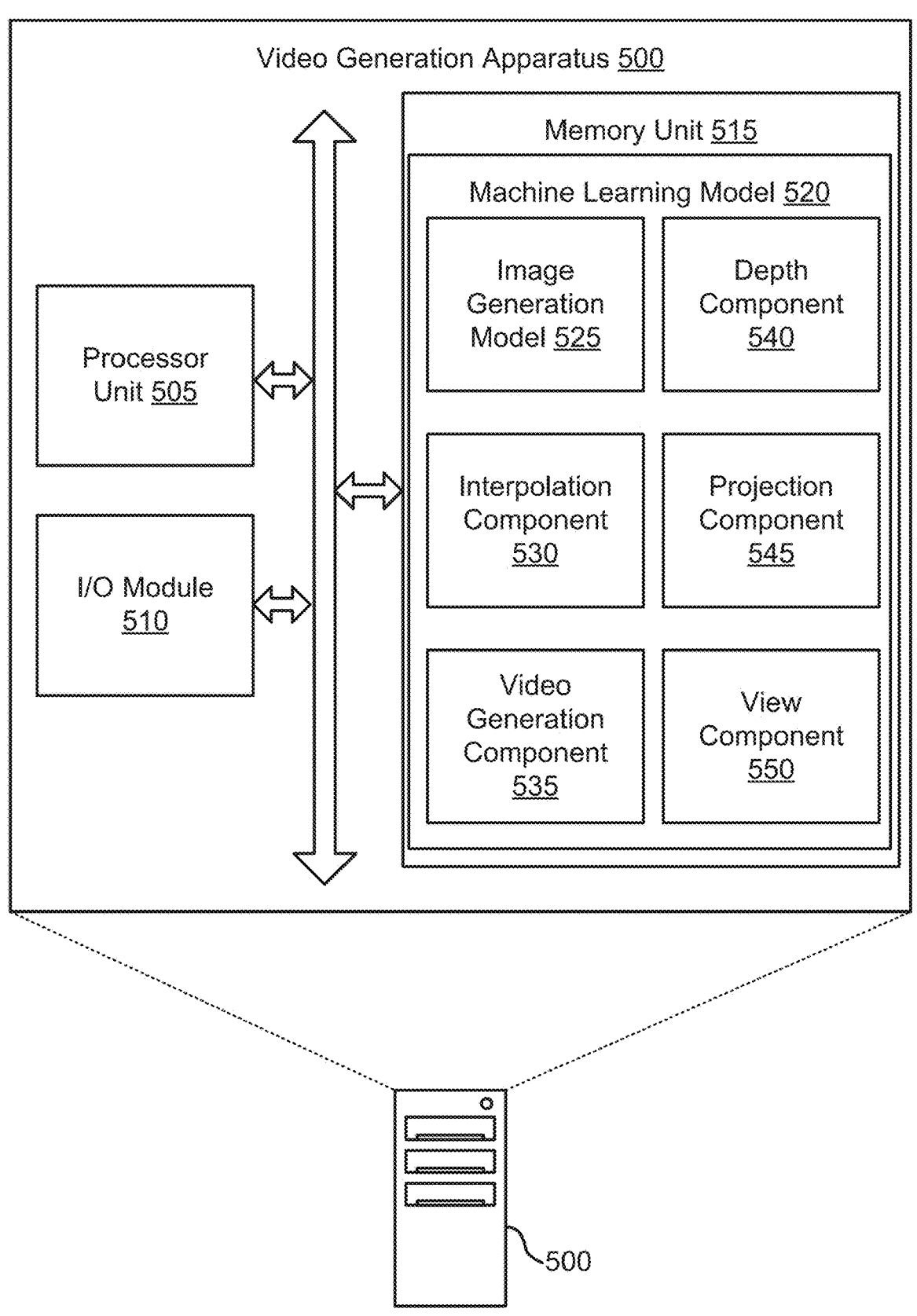
FIG. 5 shows an example of a video generation apparatus according to aspects of the present disclosure.

FIG. 5 shows an example of a video generation apparatus 500 according to aspects of the present disclosure. The example shown includes video generation apparatus 500, processor unit 505, I/O module 510, and memory unit 515. In one aspect, memory unit 515 includes machine learning model 520. In one aspect, machine learning model 520 includes image generation model 525, interpolation component 530, video generation component 535, depth component 540, projection component 545, and view component 550. Video generation apparatus 500 is an example of, or includes aspects of, the corresponding element described with reference to FIG. 1.

According to some embodiments of the present disclosure, video generation apparatus 500 includes a computer-implemented artificial neural network (ANN). An ANN is a hardware or a software component that includes a number of connected nodes (e.g., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. In some examples, nodes may determine the output using other mathematical algorithms (e.g., selecting the max from the inputs as the output) or any other suitable algorithm for activating the node. Each node and edge is associated with one or more node weights that determine how the signal is processed and transmitted.

During the training process, the one or more node weights are adjusted to increase the accuracy of the result (e.g., by minimizing a loss function that corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on the corresponding inputs. The initial layer is known as the input layer and the last layer is known as the output layer. In some cases, signals traverse certain layers multiple times.

According to some embodiments, video generation apparatus 500 includes a computer-implemented convolutional neural network (CNN). CNN is a class of neural networks commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (e.g., the receptive field). During a forward pass of the CNN, filters at each layer may be convolved across the input volume, computing the dot product between the filter and the input. During the training process, the filters may be modified so that the filters activate when the filters detect a particular feature within the input.

Processor unit 505 is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof). In some cases, processor unit 505 is configured to operate a memory array using a memory controller. In other cases, a memory controller is integrated into the processor. In some cases, processor unit 505 is configured to execute computer-readable instructions stored in a memory to perform various functions. In some embodiments, processor unit 505 includes special-purpose components for modem processing, baseband processing, digital signal processing, or transmission processing. Processor unit 505 is an example of, or includes aspects of, the processor described with reference to FIG. 10.

I/O module 510 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 510 includes a user interface. A user interface may enable a user to interact with a device. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a communication interface operates at the boundary between communicating entities and the channel and may also record and process communications. A communication interface is provided herein to enable a processing system coupled to a transceiver (e.g., a transmitter and/or a receiver). In some examples, the transceiver is configured to transmit (or send) and receive signals for a communications device via an antenna.

Examples of memory unit 515 include random access memory (RAM), read-only memory (ROM), or a hard disk. Examples of memory unit 515 include solid-state memory and a hard disk drive. In some examples, memory unit 515 is used to store computer-readable, computer-executable software including instructions that, when executed, cause a processor to perform various functions described herein. In some cases, memory unit 515 contains, among other things, a basic input/output system (BIOS) that controls basic hardware or software operations such as the interaction with peripheral components or devices. In some cases, a memory controller operates memory cells. For example, the memory controller can include a row decoder, column decoder, or both. In some cases, memory cells within memory unit 515 store information in the form of a logical state. Memory unit 515 is an example of, or includes aspects of, the memory subsystem described with reference to FIG. 10.

In one aspect, memory unit 515 includes instructions executable by processor unit 505. In one aspect, memory unit 515 includes machine learning model 520 or stores parameters of machine learning model 520.

In one aspect, machine learning model 520 includes image generation model 525, interpolation component 530, video generation component 535, depth component 540, projection component 545, and view component 550. According to some aspects, machine learning model 520 obtains an input image having an element depicted in a first view angle. In some examples, machine learning model 520 obtains a depth map of the input image, where the synthetic image is generated based on the depth map.

In some examples, machine learning model 520 generates an occlusion mask based on the depth map, where the synthetic image is generated by performing inpainting based on the occlusion mask. In some examples, machine learning model 520 obtains a text prompt. In some cases, the synthetic image is generated based on the text prompt. Machine learning model 520 is an example of, or includes aspects of, the corresponding element described with reference to FIGS. 3 and 6.

According to some aspects, image generation model 525 generates a synthetic image depicting an element of the input image from a second view angle different from the first view angle. In some examples, image generation model 525 generates an additional synthetic image depicting the element of the input image from a third view angle, where the intermediate image is interpolated based on the synthetic image and the additional synthetic image. In some aspects, the image generation model 525 is trained to generate images using training data that includes a ground truth image and an occlusion mask.

According to some aspects, image generation model 525 comprises parameters stored in the at least one memory and trained to generate a synthetic image depicting an element of an input image from a second view angle difference from a first view angle of the input image. In some aspects, the image generation model 525 includes a diffusion UNet architecture. Image generation model 525 is an example of, or includes aspects of, the corresponding element described with reference to FIG. 6. Image generation model 525 is an example of, or includes aspects of, the diffusion model described with reference to FIG. 7.

According to some aspects, interpolation component 530 generates an intermediate image by interpolating based on the synthetic image. According to some aspects, interpolation component 530 comprises parameters stored in the at least one memory and configured to generate an intermediate image by interpolating based on the synthetic image. Interpolation component 530 is an example of, or includes aspects of, the corresponding element described with reference to FIGS. 6 and 9.

According to some aspects, video generation component 535 generates a video based on the synthetic image and the intermediate image, where the video depicts the element of the input image from a changing view angle. According to some aspects, video generation component 535 comprises parameters stored in the at least one memory and configured to generate a video based on the synthetic image and the intermediate image, wherein the video depicts the element of the input image from a changing view angle. Video generation component 535 is an example of, or includes aspects of, the corresponding element described with reference to FIG. 6.

According to some aspects, depth component 540 comprises parameters stored in the at least one memory and configured to generate a depth map based on the input image. Depth component 540 is an example of, or includes aspects of, the corresponding element described with reference to FIG. 8.

According to some aspects, projection component 545 projects the input image to a 3D point cloud based on the depth map. According to some aspects, projection component 545 comprises parameters stored in the at least one memory and configured to project the input image to a 3D point cloud. Projection component 545 is an example of, or includes aspects of, the corresponding element described with reference to FIG. 8.

According to some aspects, view component 550 identifies a view trajectory, where the second view angle is based on the view trajectory. In some examples, view component 550 generates a preliminary image from the second view angle, where the preliminary image includes an occluded area and the synthetic image is generated by inpainting the occluded area of the preliminary image.

According to some aspects, view component 550 comprises parameters stored in the at least one memory and configured to generate a preliminary image from the second view angle. View component 550 is an example of, or includes aspects of, the corresponding element described with reference to FIGS. 6 and 8.

Figure 6:
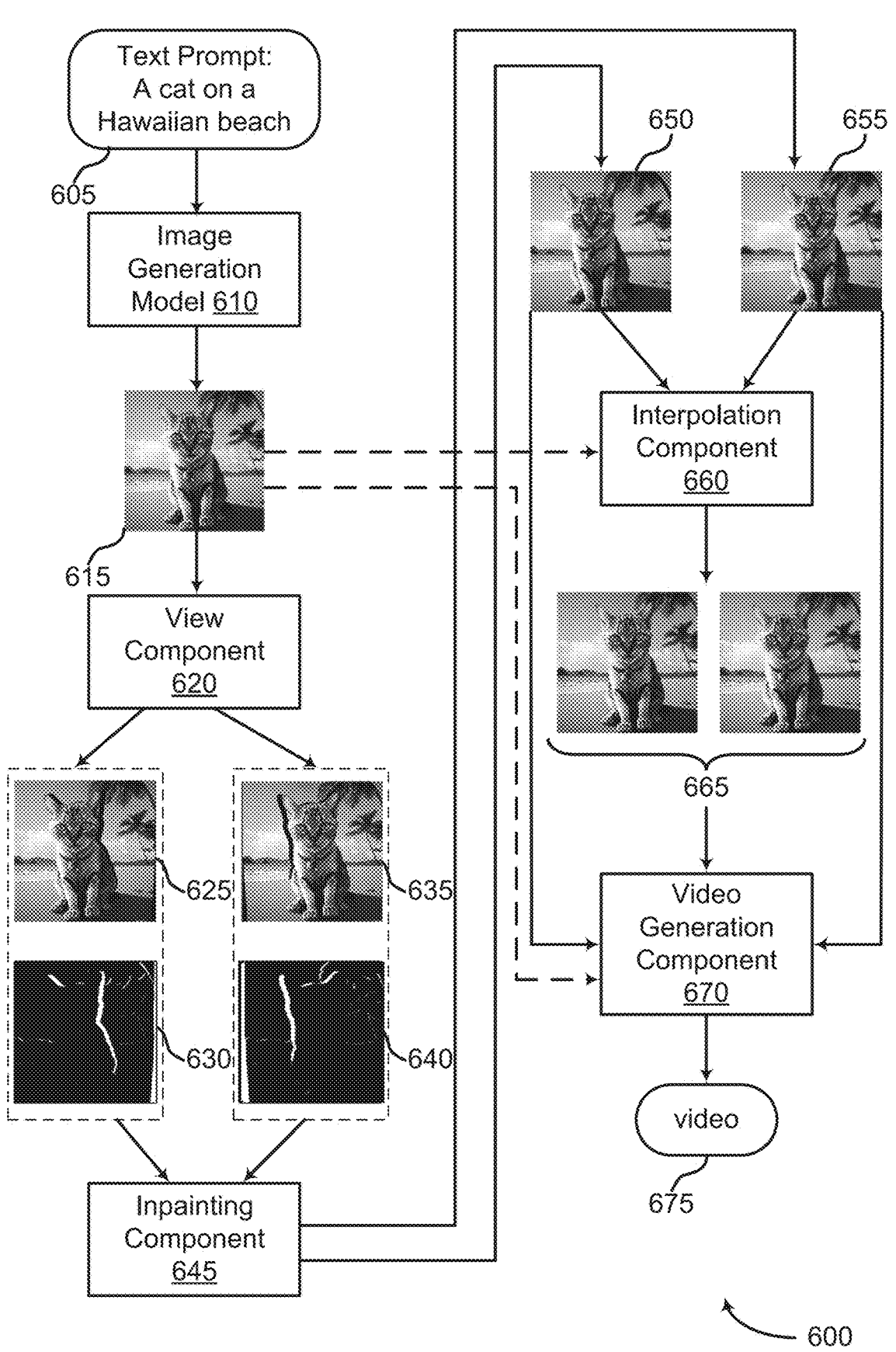
FIG. 6 shows an example of a machine learning model according to aspects of the present disclosure.

FIG. 6 shows an example of a machine learning model 600 according to aspects of the present disclosure. The example shown includes machine learning model 600, text prompt 605, image generation model 610, synthetic image 615, view component 620, first novel view 625, first mask 630, second novel view 635, second mask 640, inpainting component 645, first novel view image 650, second novel view image 655, interpolation component 660, intermediate images 665, video generation component 670, and video 675. In one aspect, machine learning model 600 includes image generation model 610, view component 620, inpainting component 645, interpolation component 660, and video generation component 670.

Referring to FIG. 6, image generation model 610 receives text prompt 605 and generates synthetic image 615 based on text prompt 605. For example, text prompt 605 states "A cat on a Hawaiian beach." In some cases, synthetic image 615 depicts contents described by text prompt 605. For example, synthetic image 615 includes a foreground element of a cat and a background scene of a Hawaiian beach. In some embodiments, machine learning model 600 receives synthetic image 615 as an input image. In some cases, synthetic image 615 depicts the cat at a first view angle (e.g., at 0 degrees). For example, synthetic image 615 depicts the cat from a front view.

In some embodiments, view component 620 receives synthetic image 615 and generates novel views at different angles and corresponding masks based on synthetic image 615. For example, view component 620 generates the first novel view 625 and first mask 630 from a second view angle. In some cases, for example, the second view angle is about −10 degrees. For example, the camera is on the left side relative to the cat in synthetic image 615. First novel view 625 includes one or more occluded areas representing the depth of the elements (e.g., the cat, the palm trees, etc.) relative to the camera. In some cases, first mask 630 shows regions of the one or more occluded areas. For example, since first novel view 625 is generated based on a second view angle (e.g., the camera is on the left side of the cat), occluded areas of first novel view 625 and first mask 630 are on the right side of the elements. In some cases, a region of the background scene on the right side of first novel view 625 includes an occluded area. In some cases, first novel view 625 is referred to as a preliminary image. In some cases, first mask 630 is referred to as an occlusion mask. In some cases, machine learning model 600 fine-tunes the occlusion mask.

In some embodiments, view component 620 generates second novel view 635 and second mask 640 from a third view angle. In some cases, for example, the third view angle is about 10 degrees. For example, the camera is on the right side relative to the cat in synthetic image 615. Second novel view 635 includes one or more occluded areas representing the depth of the elements (e.g., the cat, the palm trees, etc.) relative to the camera. In some cases, second mask 640 shows regions of the one or more occluded areas. For example, since second novel view 635 is generated based on a third view angle (e.g., the camera is on the right side of the cat), occluded areas of second novel view 635 and second mask 640 are on the left side of the elements. In some cases, a region of the background scene on the left side of second novel view 635 includes an occluded area.

In one aspect, view component 620 further includes a depth component and a projection component. Details regarding the depth component are further described with reference to FIG. 8. Details regarding the projection component are further described with reference to FIG. 8.

In some embodiments, inpainting component 645 receives novel views and the corresponding masks to generate novel view images. For example, inpainting component 645 receives first novel view 625 and first mask 630 and performs inpainting to generate first novel view image 650. In some cases, first novel view image 650 is referred to as the synthetic image. For example, inpainting component 645 receives second novel view 635 and second mask 640 and performs inpainting to generate second novel view image 655. In some cases, second novel view image 655 is referred to as the additional synthetic image. In some cases, inpainting component 645 is a diffusion-based inpainting model. For example, inpainting component 645 includes CLIO-MD.

In some embodiments, interpolation component 660 receives first novel view image 650 and second novel view image 655 to perform interpolation (e.g., image interpolation) to obtain intermediate images 665. In some embodiments, interpolation component 660 receives first novel view image 650 and synthetic image 615 to generate intermediate images 665 by performing image interpolation. In some embodiments, interpolation component 660 receives synthetic image 615 and second novel view image 655 to generate intermediate images 665 by performing image interpolation.

In some cases, intermediate images 665 includes one or more images from a view angle in between the view angles of the input images (e.g., first novel view image 650, synthetic image 615, and second novel view image 655) to interpolation component 660. For example, when interpolation component 660 receives first novel view image 650 having a second view angle and synthetic image 615 having a first view angle to generate intermediate images 665, each of the intermediate images 665 has a view angle in between the first view angle and the second view angle (e.g., −9 degrees, −8 degrees, −2 degrees, −1 degrees). In some cases, the number of the intermediate images 665 to be generated corresponds to the number of video frames to be added. In some cases, for example, the difference between two adjacent intermediate images is the same. In some cases, for example, the difference between two adjacent intermediate images is different. In some cases, the view angles are in the same view trajectory.

According to some embodiments, video generation component 670 receives first novel view image 650, intermediate images 665, and second novel view image 655 to generate video 675. In one embodiment, video generation component 670 receives first novel view image 650, first intermediate images, and synthetic image 615 to generate video 675. In one embodiment, video generation component 670 further receives second intermediate images and second novel view image 655 to generate video 675. In some cases, intermediate images 665 include first intermediate images and second intermediate images.

Machine learning model 600 is an example of, or includes aspects of, the corresponding element described with reference to FIGS. 3 and 5. Text prompt 605 is an example of, or includes aspects of, the corresponding element described with reference to FIGS. 3 and 7. Image generation model 610 is an example of, or includes aspects of, the corresponding element described with reference to FIG. 5.

Synthetic image 615 is an example of, or includes aspects of, the corresponding element described with reference to FIGS. 8 and 9. View component 620 is an example of, or includes aspects of, the corresponding element described with reference to FIGS. 5 and 8. First novel view image 650 is an example of, or includes aspects of, the corresponding element described with reference to FIG. 9. Second novel view image 655 is an example of, or includes aspects of, the corresponding element described with reference to FIG. 9.

Interpolation component 660 is an example of, or includes aspects of, the corresponding element described with reference to FIGS. 5 and 9. Video generation component 670 is an example of, or includes aspects of, the corresponding element described with reference to FIG. 5. Video 675 is an example of, or includes aspects of, the corresponding element described with reference to FIG. 3.

Figure 7:
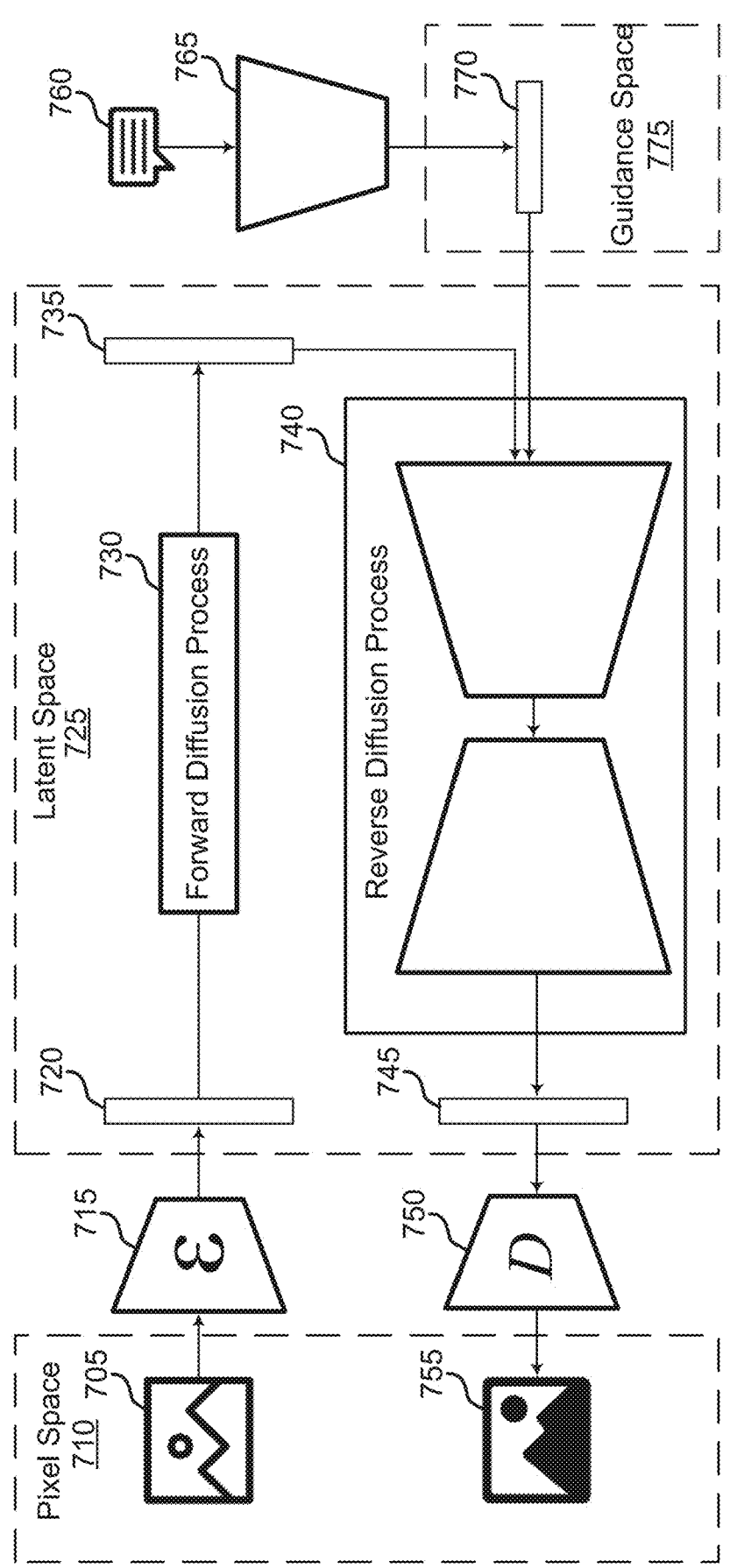
FIG. 7 shows an example of a diffusion model according to aspects of the present disclosure.

FIG. 7 shows an example of a diffusion model 700 according to aspects of the present disclosure. The example shown includes diffusion model 700, original image 705, pixel space 710, image encoder 715, original image feature 720, latent space 725, forward diffusion process 730, noisy feature 735, reverse diffusion process 740, denoised image features 745, image decoder 750, output image 755, text prompt 760, text encoder 765, guidance feature 770, and guidance space 775.

Diffusion models are a class of generative neural networks that can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance, color guidance, style guidance, and image guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (e.g., latent diffusion).

Referring to FIG. 7, diffusion models work by iteratively adding noise to the data during a forward process and then learning to recover the data by denoising the data during a reverse process. For example, during training, diffusion model 700 may take an original image 705 in a pixel space 710 as input and apply an image encoder 715 to convert original image 705 into original image features 720 in a latent space 725. Then, a forward diffusion process 730 gradually adds noise to the original image features 720 to obtain noisy features 735 (also in latent space 725) at various noise levels.

Next, a reverse diffusion process 740 (e.g., a U-Net ANN) gradually removes the noise from the noisy features 735 at the various noise levels to obtain the denoised image features 745 in latent space 725. In some examples, denoised image features 745 are compared to the original image features 720 at each of the various noise levels, and parameters of the reverse diffusion process 740 of the diffusion model are updated based on the comparison. Finally, an image decoder 750 decodes the denoised image features 745 to obtain an output image 755 in pixel space 710. In some cases, an output image 755 is created at each of the various noise levels. The output image 755 can be compared to the original image 705 to train the reverse diffusion process 740. In some cases, output image 755 refers to synthetic image (e.g., described with reference to FIGS. 6 and 8).

In some cases, image encoder 715 and image decoder 750 are pre-trained prior to training the reverse diffusion process 740. In some examples, image encoder 715 and image decoder 750 are trained jointly, or the image encoder 715 and image decoder 750 are fine-tuned jointly with the reverse diffusion process 740.

The reverse diffusion process 740 can also be guided based on a text prompt 760, or another guidance prompt, such as an image, a layout, a style, a color, a segmentation map, etc. The text prompt 760 can be encoded using a text encoder 765 (e.g., a multimodal encoder) to obtain guidance features 770 in guidance space 775. The guidance features 770 can be combined with the noisy features 735 at one or more layers of the reverse diffusion process 740 to ensure that the output image 755 includes content described by the text prompt 760. For example, guidance feature 770 can be combined with the noisy feature 735 using a cross-attention block within the reverse diffusion process 740. In some cases, text prompt 760 refers to the corresponding element described with reference to FIGS. 3 and 6.

In some examples, diffusion models are based on a neural network architecture known as a U-Net. The U-Net takes input features having an initial resolution and an initial number of channels, and processes the input features using an initial neural network layer (e.g., a convolutional network layer) to generate intermediate features. The intermediate features are then down-sampled using a down-sampling layer such that down-sampled features have a resolution less than the initial resolution and a number of channels greater than the initial number of channels.

This process is repeated multiple times, and then the process is reversed. For example, the down-sampled features are up-sampled using up-sampling process to obtain up-sampled features. The up-sampled features can be combined with intermediate features having a same resolution and number of channels via a skip connection. These inputs are processed using a final neural network layer to produce output features. In some cases, the output features have the same resolution as the initial resolution and the same number of channels as the initial number of channels.

In some cases, a U-Net takes additional input features to produce conditionally generated output. For example, the additional input features may include a vector representation of an input prompt. The additional input features can be combined with the intermediate features within the neural network at one or more layers. For example, a cross-attention module can be used to combine the additional input features and the intermediate features.

A diffusion process may also be modified based on conditional guidance. In some cases, a user provides a text prompt (e.g., text prompt 760) describing content to be included in a generated image. For example, a user may provide the prompt "A cat on a Hawaiian beach". In some examples, guidance can be provided in a form other than text, such as via an image, a sketch, a color, a style, or a layout. The system converts text prompt 760 (or other guidance) into a conditional guidance vector or other multi-dimensional representation. For example, text may be converted into a vector or a series of vectors using a transformer model, or a multi-modal encoder. In some cases, the encoder for the conditional guidance is trained independently of the diffusion model.

A transformer, transformer model, or transformer network is a type of neural network model used for natural language processing tasks. A transformer network transforms one sequence into another sequence using an encoder and a decoder. The encoder and decoder include modules that can be stacked on top of each other multiple times. The modules comprise multi-head attention and feed-forward layers. The inputs and outputs (target sentences) are first embedded into an n-dimensional space. Positional encoding of the different words (e.g., give every word/part in a sequence a relative position since the sequence depends on the order of its elements) is added to the embedded representation (n-dimensional vector) of each word. In some examples, a transformer network includes an attention mechanism, where the attention looks at an input sequence and decides at each step which other parts of the sequence are important. The attention mechanism involves a query, keys, and values denoted by Q, K, and V, respectively. Q is a matrix that contains the query (vector representation of one word in the sequence), K are all the keys (vector representations of all the words in the sequence) and V are the values, which are again the vector representations of all the words in the sequence. For the encoder and decoder, multi-head attention modules, V consists of the same word sequence as Q. However, for the attention module that takes into account the encoder and the decoder sequences, V is different from the sequence represented by Q. In some cases, values in V are multiplied and summed with some attention-weights a.

In the machine learning field, an attention mechanism is a method of placing differing levels of importance on different elements of an input. Calculating attention may involve three basic steps. First, a similarity between query and key vectors obtained from the input is computed to generate attention weights. Similarity functions used for this process can include dot product, splice, detector, and the like. Next, a softmax function is used to normalize the attention weights. Finally, the attention weights are weighed together with the corresponding values. In the context of an attention network, the key and value are vectors or matrices that are used to represent the input data. The key is used to determine which parts of the input the attention mechanism should focus on, while the value is used to represent the actual data being processed.

The term "self-attention" refers to a machine learning model in which representations of the input interact with each other to determine attention weights for the input.

Self-attention can be distinguished from other attention models because the attention weights are determined at least in part by the input itself.

A noise map is initialized that includes random noise. The noise map may be in a pixel space or a latent space. By initializing an image with random noise, different variations of an image including the content described by the conditional guidance can be generated. Then, the diffusion model 700 generates an image based on the noise map and the conditional guidance vector.

A diffusion process can include both a forward diffusion process 730 for adding noise to an image (e.g., original image 705) or features (e.g., original image feature 720) in a latent space 725 and a reverse diffusion process 740 for denoising the images (or features) to obtain a denoised image (e.g., output image 755). The forward diffusion process 730 can be represented as $q(x_t|x_{t-1})$, and the reverse diffusion process 740 can be represented as $p(x_{t-1}|x_t)$. In some cases, the forward diffusion process 730 is used during training to generate images with successively greater noise, and a neural network is trained to perform the reverse diffusion process 740 (e.g., to successively remove the noise).

In an example forward diffusion process 730 for a latent diffusion model (e.g., diffusion model 700), the diffusion model 700 maps an observed variable $x_0$ (either in a pixel space 710 or a latent space 725) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse diffusion process 740. During the reverse diffusion process 740, the diffusion model 700 begins with noisy data $x_T$, such as a noisy image and denoises the data to obtain the $p(x_{t-1}|x_t)$. At each step $t-1$, the reverse diffusion process 740 takes $x_t$, such as the first intermediate image, and t as input. Here, t represents a step in the sequence of transitions associated with different noise levels, The reverse diffusion process 740 outputs $x_{t-1}$, such as the second intermediate image iteratively until $x_T$ is reverted back to $x_0$, the original image 705. The reverse diffusion process 740 can be represented as:

$$p_\theta(x_{t-1} \mid x_t) := N\left(x_{t-1}; \mu_\theta(x_t, t), \sum\nolimits_\theta(x_t, t)\right). \tag{1}$$

The joint probability of a sequence of samples in the Markov chain can be written as a product of conditionals and the marginal probability:

$$x_T: \; p_\theta(x_{0:T}) := p(x_T)\prod\nolimits_{t=1}^{T} p_\theta(x_{t-1} \mid x_t), \tag{2}$$

where $p(x_T)=N(x_T; 0,1)$ is the pure noise distribution as the reverse diffusion process 740 takes the outcome of the forward diffusion process 730, a sample of pure noise, as input and $$\prod\nolimits_{t=1}^{T} p_\theta(x_{t-1} \mid x_t)$$

represents a sequence of Gaussian transitions corresponding to a sequence of addition of Gaussian noise to the sample.

At interference time, observed data $x_0$ in a pixel space can be mapped into a latent space 725 as input and a generated data $\tilde{x}$ is mapped back into the pixel space 710 from the latent space 725 as output. In some examples, $x_0$ represents an original input image with low image quality, latent variables $x_1, \ldots, x_T$ represent noisy images, and x represents the generated image with high image quality.

A diffusion model 700 may be trained using both a forward diffusion process 730 and a reverse diffusion process 740. In one example, the user initializes an untrained model. Initialization can include defining the architecture of the model and establishing initial values for the model parameters. In some cases, the initialization can include defining hyper-parameters such as the number of layers, the resolution and channels of each layer block, the location of skip connections, and the like.

The system then adds noise to a training image using a forward diffusion process 730 in N stages. In some cases, the forward diffusion process 730 is a fixed process where Gaussian noise is successively added to an image. In latent diffusion models, the Gaussian noise may be successively added to features (e.g., original image features 720) in a latent space 725.

At each stage n, starting with stage N, a reverse diffusion process 740 is used to predict the image or image features at stage n−1. For example, the reverse diffusion process 740 can predict the noise that was added by the forward diffusion process 730, and the predicted noise can be removed from the image to obtain the predicted image. In some cases, an original image 705 is predicted at each stage of the training process.

The training component compares the predicted image (or image features) at stage n−1 to an actual image (or image features), such as the image at stage n−1 or the original input image. For example, given observed data x, the diffusion model 700 may be trained to minimize the variational upper bound of the negative log-likelihood-log $p_\theta(x)$ of the training data. The training system then updates parameters of the diffusion model 700 based on the comparison. For example, parameters of a U-Net may be updated using gradient descent. Time-dependent parameters of the Gaussian transitions can also be learned.

Diffusion model 700 is an example of, or includes aspects of, the image generation model described with reference to FIGS. 5 and 6. Text prompt 760 is an example of, or includes aspects of, the corresponding element described with reference to FIGS. 3 and 6.

Figure 8:
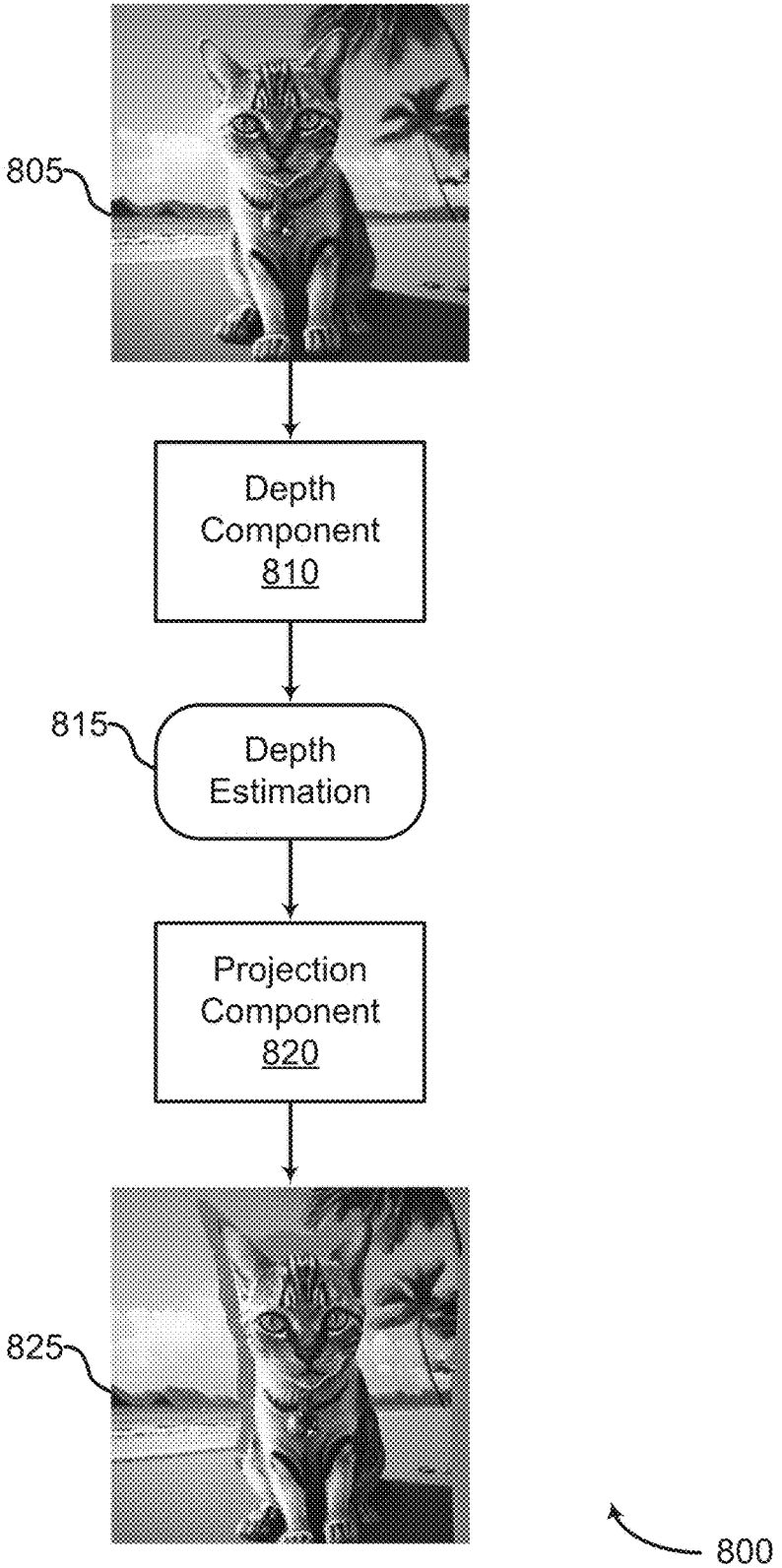
FIG. 8 shows an example of a view component according to aspects of the present disclosure.

FIG. 8 shows an example of a view component according to aspects of the present disclosure. The example shown includes view component 800, synthetic image 805, depth component 810, depth estimation 815, projection component 820, and 3D point cloud 825. In one aspect, view component 800 includes depth component 810 and projection component 820.

Referring to FIG. 8, depth component 810 receives synthetic image 805 (e.g., generated from the image generation model described with reference to FIGS. 5 and 6) and generates depth estimation 815. In some cases, depth component 810 receives an input image to generate depth estimation 815. Depth estimation 815 includes pseudo-depth data of an element in an image. For example, depth component 810 samples point-pairs of pixels in the image using edge-guided sampling and instance-guided sampling. In some cases, edge-guided sampling refers to point pairs that characterize the location of the depth boundaries and reduce false depth boundaries resulting from strong image edges. In some cases, instance-guided sampling improves the depth structural accuracy of salient object instances. By sampling the point pairs with low-level edge maps and high-level object instance masks, depth component 810 can accurately generate depth estimation 815 of objects or elements in synthetic image 805.

In some embodiments, projection component 820 generates 3D point cloud 825 of the object or elements in synthetic image 805 using depth estimation 815. For example, projection component 820 projects elements of synthetic image 805 in a 3D space. For example, the projection component 820 augments Z values that represent the distance between a camera and the pixels at various view angles of an element in the synthetic image 805 to generate 3D point cloud 825 for the element. By using 3D point cloud 825, view component 800 can view the element from different view angles. In some cases, view component 800 can display the corresponding occlusion region at the different view angles. For example, 3d point cloud 825 shows one or more gray regions representing the occlusion region from different view angles. According to some embodiments, view component 800 uses 3D point cloud 825 to generate novel views and corresponding masks (e.g., the first novel view and the first mask described with reference to FIG. 6).

View component 800 is an example of, or includes aspects of, the corresponding element described with reference to FIGS. 5 and 6. Synthetic image 805 is an example of, or includes aspects of, the corresponding element described with reference to FIGS. 6 and 9. Depth component 810 is an example of, or includes aspects of, the corresponding element described with reference to FIG. 5. Projection component 820 is an example of, or includes aspects of, the corresponding element described with reference to FIG. 5.

FIG. 9 shows an example of an interpolation component according to aspects of the present disclosure. The example shown includes interpolation component 900, first novel view image 905, first intermediate image 910, synthetic image 915, second intermediate image 920, and second novel view image 925.

Referring to FIG. 9, interpolation component 900 receives synthetic image 915 generated from the image generation model (described with reference to FIGS. 5 and 6) and first novel view image 905 and second novel view image 925 generated from view component (described with reference to FIGS. 5, 6, and 8) to generate first intermediate image 910 and second intermediate image 920. For example, interpolation component 900 receives first novel view image 905 having a second view angle and synthetic image 915 image having a first view angle to generate first intermediate image 910 having a view angle between the first view angle and the second view angle. For example, when the first view angle is 0 degrees and second view angle is −10 degrees, the view angle of first intermediate image 910 may range from greater than −10 degrees to less than 0 degrees. In some cases, for example, interpolation component 900 interpolates multiple first intermediate images.

In some embodiments, interpolation component 900 receives synthetic image 915 having a first view angle and second novel view image 925 having a third view angle to generate second intermediate image 920 having a view angle between the first view angle and the third view angle. For example, when the first view angle is 0 degrees and the third view angle is 10 degrees, the view angle of second intermediate image 920 may range from greater than 0 degrees to less than 10 degrees. In some cases, for example, interpolation component 900 interpolates multiple second intermediate images.

In some embodiments, interpolation component combines first novel view image 905, first intermediate image 910, synthetic image 915, second intermediate image 920, and second novel view image 925 into a video (e.g., the video described with reference to FIG. 6). Alternatively, a video generation component is used to combine the images to generate the video. By interpolating intermediate images from any of the two input images, the machine learning model can generate a video having temporal consistency and image consistency. Additionally, processing time for video generation can be reduced.

Interpolation component 900 is an example of, or includes aspects of, the corresponding element described with reference to FIGS. 5 and 6. First novel view image 905 is an example of, or includes aspects of, the corresponding element described with reference to FIG. 6. Synthetic image 915 is an example of, or includes aspects of, the corresponding element described with reference to FIGS. 6 and 8. Second novel view image 925 is an example of, or includes aspects of, the corresponding element described with reference to FIG. 6.

Computing Device

FIG. 10 shows an example of a computing device 1000 according to aspects of the present disclosure. The example shown includes computing device 1000, processor(s), memory subsystem 1010, communication interface 1015, I/O interface 1020, user interface component(s), and channel 1030.

In some embodiments, computing device 1000 is an example of, or includes aspects of, the video generation apparatus described with reference to FIGS. 1 and 5. In some embodiments, computing device 1000 includes one or more processors 1005 that can execute instructions stored in memory subsystem 1010 to obtain an input image having an element depicted a first view angle. In some embodiments, the instructions further include generating, using an image generation model, a synthetic image depicting an element of the input image from a second view angle different from the first view angle. In some embodiments, the instructions further include generating an intermediate image by interpolating based on the synthetic image. In some embodiments, the instructions further include generating a video based on the synthetic image and the intermediate image, wherein the video depicts the element of the input image from a changing view angle.

According to some embodiments, computing device 1000 includes one or more processors 1005. In some cases, a processor is an intelligent hardware device, (e.g., a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special-purpose components for modem processing, baseband processing, digital signal processing, or transmission processing. Processor(s) 1005 is an example of, or includes aspects of, the processor unit described with reference to FIG. 5.

According to some embodiments, memory subsystem 1010 includes one or more memory devices. Examples of a memory device include random access memory (RAM), read-only memory (ROM), or a hard disk. Examples of memory devices include solid-state memory and a hard disk drive. In some examples, memory is used to store computer-readable, computer-executable software including instructions that, when executed, cause a processor to perform various functions described herein. In some cases, the memory contains, among other things, a basic input/output system (BIOS) that controls basic hardware or software operations such as the interaction with peripheral components or devices. In some cases, a memory controller operates memory cells. For example, the memory controller can include a row decoder, column decoder, or both. In some cases, memory cells within a memory store information in the form of a logical state. Memory subsystem 1010 is an example of, or includes aspects of, the memory unit described with reference to FIG. 5.

According to some embodiments, communication interface 1015 operates at a boundary between communicating entities (such as computing device 1000, one or more user devices, a cloud, and one or more databases) and channel 1030 and can record and process communications. In some cases, communication interface 1015 is provided to enable a processing system coupled to a transceiver (e.g., a transmitter and/or a receiver). In some examples, the transceiver is configured to transmit (or send) and receive signals for a communications device via an antenna. In some cases, a bus is used in communication interface 1015.

According to some embodiments, I/O interface 1020 is controlled by an I/O controller to manage input and output signals for computing device 1000. In some cases, I/O interface 1020 manages peripherals not integrated into computing device 1000. In some cases, I/O interface 1020 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1020 or hardware components controlled by the I/O controller.

According to some embodiments, user interface component(s) 1025 enables a user to interact with computing device 1000. In some cases, user interface component(s) 1025 include an audio device, such as an external speaker system, an external display device such as a display screen, an input device (e.g., a remote-control device interfaced with a user interface directly or through the I/O controller), or a combination thereof.

The performance of apparatus, systems, and methods of the present disclosure have been evaluated, and results indicate embodiments of the present disclosure have obtained increased performance over existing technology (e.g., video generation models). Example experiments demonstrate that the video generation apparatus based on the present disclosure outperforms conventional video generation models. Details on the example use case based on embodiments of the present disclosure are described with reference to FIG. 3.

The description and drawings described herein represent example configurations and do not represent all the implementations within the scope of the claims. For example, the operations and steps may be rearranged, combined, or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EE-PROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining an input image having an element depicted from a first camera view angle;

generating a novel view image depicting the element from a second camera view angle different from the first camera view angle, wherein the novel view image is generated using a 3D model of the element, and wherein the novel view image includes an occluded area;

generating, using an image generation model, an inpainted image depicting the element of the input image from the second camera view angle by performing a diffusion process to inpaint the occluded area of the novel view image;

generating an intermediate image by performing image interpolation between the input image and the inpainted image, wherein the intermediate image has a camera view angle between the first camera view angle and the second camera view angle; and generating a video based on the input image, the inpainted image, and the intermediate image, wherein the video depicts the element of the input image from a changing camera view angle.

2. The method of claim 1, further comprising:

generating, using the image generation model, an additional synthetic image depicting the element of the input image from a third camera view angle, wherein the intermediate image is interpolated based on the inpainted image and the additional synthetic image.

3. The method of claim 1, further comprising:

identifying a view trajectory, wherein the second camera view angle is based on the view trajectory.

4. The method of claim 1, wherein generating the inpainted image comprises:

generating a preliminary image from the second camera view angle, wherein the preliminary image includes an occluded area and the inpainted image is generated by inpainting the occluded area of the preliminary image.

5. The method of claim 1, further comprising:

obtaining a depth map of the input image, wherein the inpainted image is generated based on the depth map.

6. The method of claim 5, further comprising:

projecting the input image to a 3D point cloud based on the depth map.

7. The method of claim 5, further comprising:

generating an occlusion mask based on the depth map, wherein the inpainted image is generated by performing inpainting based on the occlusion mask.

8. The method of claim 1, further comprising:

obtaining a text prompt, wherein the inpainted image is generated based on the text prompt.

9. The method of claim 1, further comprising:

obtaining a text prompt, wherein the input image is generated based on the text prompt.

10. The method of claim 1, wherein:

the image generation model is trained to generate images using training data that includes a ground truth image and an occlusion mask.

11. An apparatus comprising:

at least one processor;

at least one memory storing instructions executable by the at least one processor;

a view component comprising parameters stored in the at least one memory and configured to generate a novel view image depicting an element from a second camera view angle different from a first camera view angle of an input image, wherein the novel view image is generated using a 3D model of the element, and wherein the novel view image includes an occluded area;

an image generation model comprising parameters stored in the at least one memory and trained to generate an inpainted image depicting the element from the second camera view angle by performing a diffusion process to inpaint the occluded area of the novel view image;

an interpolation component comprising parameters stored in the at least one memory and configured to generate an intermediate image by performing image interpolation between the input image and the inpainted image, wherein the intermediate image has a camera view angle between the first camera view angle and the second camera view angle; and a video generation component comprising parameters stored in the at least one memory and configured to generate a video based on the input image, the inpainted image, and the intermediate image, wherein the video depicts the element of the input image from a changing camera view angle.

12. The apparatus of claim 11, further comprising:

a depth component comprising parameters stored in the at least one memory and configured to generate a depth map based on the input image.

13. The apparatus of claim 11, further comprising:

a projection component comprising parameters stored in the at least one memory and configured to project the input image to a 3D point cloud.

14. The apparatus of claim 11, further comprising:

a view component comprising parameters stored in the at least one memory and configured to generate a preliminary image from the second camera view angle.

15. The apparatus of claim 11, wherein, the image generation model comprises a diffusion UNet architecture.

16. A non-transitory computer readable medium storing code for video generation, the code comprising instructions executable by at least one processor to:

obtain an input image having an element depicted from a first camera view angle;

generate a novel view image depicting the element from a second camera view angle different from the first camera view angle, wherein the novel view image is generated using a 3D model of the element, and wherein the novel view image includes an occluded area;

generate, using an image generation model, an inpainted image depicting the element of the input image from the second camera view angle by performing a diffusion process to inpaint the occluded area of the novel view image;

generate an intermediate image by performing image interpolation between the input image and the inpainted image, wherein the intermediate image has a camera view angle between the first camera view angle and the second camera view angle; and generate a video based on the input image, the inpainted image, and the intermediate image, wherein the video depicts the element of the input image from a changing camera view angle.

17. The non-transitory computer readable medium of claim 16, the code further comprising instructions executable by the at least one processor to:

generate, using the image generation model, an additional synthetic image depicting the element of the input image from a third camera view angle, wherein the intermediate image is interpolated based on the inpainted image and the additional synthetic image.

18. The non-transitory computer readable medium of claim 16, the code further comprising instructions executable by the at least one processor to:

generate a preliminary image from the second camera view angle, wherein the preliminary image includes an occluded area and the inpainted image is generated by inpainting the occluded area of the preliminary image.

19. The non-transitory computer readable medium of claim 16, the code further comprising instructions executable by the at least one processor to:

obtain a depth map of the input image, wherein the inpainted image is generated based on the depth map.

20. The non-transitory computer readable medium of claim 19, the code further comprising instructions executable by the at least one processor to:

generate an occlusion mask based on the depth map, wherein the inpainted image is generated by performing inpainting based on the occlusion mask.

* * * * *